(12) United States Patent
Drake

(10) Patent No.: US 10,162,465 B2
(45) Date of Patent: Dec. 25, 2018

(54) METHODS AND DEVICES FOR DETERMINING TOUCH LOCATIONS ON A TOUCH-SENSITIVE SURFACE

(71) Applicant: Parade Technologies, Ltd., Santa Clara, CA (US)

(72) Inventor: Victor Paul Drake, Clyde Hill, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 35 days.

(21) Appl. No.: 15/221,513

(22) Filed: Jul. 27, 2016

(65) Prior Publication Data

US 2017/0031521 A1    Feb. 2, 2017

Related U.S. Application Data

(60) Provisional application No. 62/197,363, filed on Jul. 27, 2015.

(51) Int. Cl.
  *G06F 3/041* (2006.01)
  *G06F 3/044* (2006.01)

(52) U.S. Cl.
  CPC ........... *G06F 3/0418* (2013.01); *G06F 3/044* (2013.01); *G06F 2203/04108* (2013.01)

(58) Field of Classification Search
  CPC ................. G06F 3/0418; G06F 3/044; G06F 2203/04108
  See application file for complete search history.

(56) References Cited

U.S. PATENT DOCUMENTS

| 8,462,135 | B1* | 6/2013 | Xiao | G06F 3/0416 345/156 |
| 2012/0262419 | A1* | 10/2012 | Hershman | G06F 3/044 345/174 |
| 2014/0028579 | A1* | 1/2014 | Taby | G06F 3/0488 345/173 |
| 2015/0015538 | A1* | 1/2015 | Tanaka | G06F 3/044 345/174 |

\* cited by examiner

*Primary Examiner* — Towfiq Elahi
(74) *Attorney, Agent, or Firm* — Morgan, Lewis & Bockius LLP

(57) ABSTRACT

A method is performed at a touch sensing system that includes a two-dimensional capacitive sense array. The process measures the capacitance of the capacitive sensors, and identifies a first sensor whose measured capacitance is a local peak. The local peak is within a local rectangular array. The process computes column sums for each column of the rectangular array and determines whether to apply a smoothing algorithm. When the smoothing algorithm is not applied, the process computes an x-coordinate of a touch using a plurality of the column sums. When applying the smoothing algorithm, the process computes the x-coordinate of the touch as an average of two x-coordinate calculations. Each of the two x-coordinate calculations conditionally performs a horizontal shift of the local rectangular array based on comparing the peak measured capacitance to an adjacent measured capacitance and computes a respective x-coordinate using a respective plurality of the column sums.

12 Claims, 15 Drawing Sheets

| Corner | OuterEdge | OuterEdge | OuterEdge | OuterEdge | Corner |
|---|---|---|---|---|---|
| OuterEdge | InnerEdge | InnerEdge | InnerEdge | InnerEdge | OuterEdge |
| OuterEdge | InnerEdge | Core | Core | InnerEdge | OuterEdge |
| OuterEdge | InnerEdge | Core | Core | InnerEdge | OuterEdge |
| OuterEdge | InnerEdge | InnerEdge | InnerEdge | InnerEdge | OuterEdge |
| Corner | OuterEdge | OuterEdge | OuterEdge | OuterEdge | Corner |

Figure 4A

| | Corner | OuterEdge | OuterEdge | Corner | |
|---|---|---|---|---|---|
| Corner | InnerCorner | InnerEdge | InnerEdge | InnerCorner | Corner |
| OuterEdge | InnerEdge | Core | Core | InnerEdge | OuterEdge |
| OuterEdge | InnerEdge | Core | Core | InnerEdge | OuterEdge |
| Corner | InnerCorner | InnerEdge | InnerEdge | InnerCorner | Corner |
| | Corner | OuterEdge | OuterEdge | Corner | |

|  | $C_0$ | $C_1$ | $C_2$ | $C_3$ | $C_4$ |
|---|---|---|---|---|---|
| $R_0$ | $Diff_{00}$ | $Diff_{01}$ | $Diff_{02}$ | $Diff_{03}$ | $Diff_{04}$ |
| $R_1$ | $Diff_{10}$ | $Diff_{11}$ | $Diff_{12}$ | $Diff_{13}$ | $Diff_{14}$ |
| $R_2$ | $Diff_{20}$ | $Diff_{21}$ | $Diff_{22}$ | $Diff_{23}$ | $Diff_{24}$ |
| $R_3$ | $Diff_{30}$ | $Diff_{31}$ | $Diff_{32}$ | $Diff_{33}$ | $Diff_{34}$ |
| $R_4$ | $Diff_{40}$ | $Diff_{41}$ | $Diff_{42}$ | $Diff_{43}$ | $Diff_{44}$ |

|  | $C_0$ | $C_1$ | $C_2$ | $C_3$ | $C_4$ |
|---|---|---|---|---|---|
| $R_0$ | 0 | $Diff_{01}$ | $Diff_{02}$ | $Diff_{03}$ | $Diff_{04}$ |
| $R_1$ | 0 | $Diff_{11}$ | $Diff_{12}$ | $Diff_{13}$ | $Diff_{14}$ |
| $R_2$ | 0 | $Diff_{21}$ | $Diff_{22}$ | $Diff_{23}$ | $Diff_{24}$ |
| $R_3$ | 0 | $Diff_{31}$ | $Diff_{32}$ | $Diff_{33}$ | $Diff_{34}$ |
| $R_4$ | 0 | $Diff_{41}$ | $Diff_{42}$ | $Diff_{43}$ | $Diff_{44}$ |

|       | $C_0$       | $C_1$       | $C_2$         | $C_3$       | $C_4$       |
|-------|-------------|-------------|---------------|-------------|-------------|
| $R_0$ | 0           | 0           | 0             | 0           | 0           |
| $R_1$ | 0           | 0           | 0             | 0           | 0           |
| $R_2$ | $Diff_{20}$ | $Diff_{21}$ | $Diff_{22}$ | $Diff_{23}$ | $Diff_{24}$ |
| $R_3$ | $Diff_{30}$ | $Diff_{31}$ | $Diff_{32}$   | $Diff_{33}$ | $Diff_{34}$ |
| $R_4$ | $Diff_{40}$ | $Diff_{41}$ | $Diff_{42}$   | $Diff_{43}$ | $Diff_{44}$ |

|       | $C_0$ | $C_1$       | $C_2$           | $C_3$       | $C_4$       |
|-------|-------|-------------|-----------------|-------------|-------------|
| $R_0$ | 0     | 0           | 0               | 0           | 0           |
| $R_1$ | 0     | $Diff_{11}$ | $Diff_{12}$     | $Diff_{13}$ | $Diff_{14}$ |
| $R_2$ | 0     | $Diff_{21}$ | $Diff_{22}$ | $Diff_{23}$ | $Diff_{24}$ |
| $R_3$ | 0     | $Diff_{31}$ | $Diff_{32}$     | $Diff_{33}$ | $Diff_{34}$ |
| $R_4$ | 0     | $Diff_{41}$ | $Diff_{42}$     | $Diff_{43}$ | $Diff_{44}$ |

|  | $C_0$ | $C_1$ | $C_2$ | $C_3$ | $C_4$ |
|---|---|---|---|---|---|
| $R_0$ | 0 | $Diff_{01}$ | $Diff_{02}$ | $Diff_{03}$ | 0 |
| $R_1$ | 0 | $Diff_{11}$ | $Diff_{12}$ | $Diff_{13}$ | 0 |
| $R_2$ | 0 | $Diff_{21}$ | $\mathbf{Diff_{22}}$ | $Diff_{23}$ | 0 |
| $R_3$ | 0 | $Diff_{31}$ | $Diff_{32}$ | $Diff_{33}$ | 0 |
| $R_4$ | 0 | $Diff_{41}$ | $Diff_{42}$ | $Diff_{43}$ | 0 |

|  | $C_0$ | $C_1$ | $C_2$ | $C_3$ | $C_4$ |
|---|---|---|---|---|---|
| $R_0$ | 0 | $Diff_{01}$ | $Diff_{02}$ | $Diff_{03}$ | 0 |
| $R_1$ | 0 | $Diff_{11}$ | $Diff_{12}$ | $Diff_{13}$ | 0 |
| $R_2$ | 0 | $Diff_{21}$ | $Diff_{22}$ | $Diff_{23}$ | 0 |
| $R_3$ | 0 | $Diff_{31}$ | $Diff_{32}$ | $Diff_{33}$ | 0 |
| $R_4$ | 0 | $Diff_{41}$ | $Diff_{42}$ | $Diff_{43}$ | 0 |

|  | $C_0$ | $C_1$ | $C_2$ | $C_3$ | $C_4$ |
|---|---|---|---|---|---|
| $R_0$ | $Edge_{00}$ | $Diff_{01}$ | $Diff_{02}$ | $Diff_{03}$ | $Edge_{04}$ |
| $R_1$ | $Edge_{10}$ | $Diff_{11}$ | $Diff_{12}$ | $Diff_{13}$ | $Edge_{14}$ |
| $R_2$ | $Edge_{10}$ | $Diff_{21}$ | $Diff_{22}$ | $Diff_{23}$ | $Edge_{24}$ |
| $R_3$ | $Edge_{10}$ | $Diff_{31}$ | $Diff_{32}$ | $Diff_{33}$ | $Edge_{34}$ |
| $R_4$ | $Edge_{40}$ | $Diff_{41}$ | $Diff_{42}$ | $Diff_{43}$ | $Edge_{44}$ |

| | $C_0$ | $C_1$ | $C_2$ | $C_3$ | $C_4$ |
|---|---|---|---|---|---|
| $R_0$ | $Diff_{00}$ | $Diff_{01}$ | $Diff_{02}$ | $Diff_{03}$ | $Diff_{04}$ |
| $R_1$ | $Diff_{10}$ | $Diff_{11}$ | $Diff_{12}$ | $Diff_{13}$ | $Diff_{14}$ |
| $R_2$ | $Diff_{20}$ | $Diff_{21}$ | $Diff_{22}$ | $Diff_{23}$ | $Diff_{24}$ |
| $R_3$ | $Diff_{30}$ | $Diff_{31}$ | $Diff_{32}$ | $Diff_{33}$ | $Diff_{34}$ |
| $R_4$ | $Diff_{40}$ | $Diff_{41}$ | $Diff_{42}$ | $Diff_{43}$ | $Diff_{44}$ |

| | $C_0$ | $C_1$ | $C_2$ | $C_3$ | $C_4$ | $C_5$ |
|---|---|---|---|---|---|---|
| $R_0$ | $Diff_{00}$ | $Diff_{01}$ | $Diff_{02}$ | $Diff_{03}$ | $Diff_{04}$ | $Diff_{05}$ |
| $R_1$ | $Diff_{10}$ | $Diff_{11}$ | $Diff_{12}$ | $Diff_{13}$ | $Diff_{14}$ | $Diff_{15}$ |
| $R_2$ | $Diff_{20}$ | $Diff_{21}$ | $Diff_{22}$ | $Diff_{23}$ | $Diff_{24}$ | $Diff_{25}$ |
| $R_3$ | $Diff_{30}$ | $Diff_{31}$ | $Diff_{32}$ | $Diff_{33}$ | $Diff_{34}$ | $Diff_{35}$ |
| $R_4$ | $Diff_{40}$ | $Diff_{41}$ | $Diff_{42}$ | $Diff_{43}$ | $Diff_{44}$ | $Diff_{45}$ |

|  | $C_{-1}$ | $C_0$ | $C_1$ | $C_2$ | $C_3$ | $C_4$ | $C_5$ |
|---|---|---|---|---|---|---|---|
| $R_0$ | $Diff_{0-1}$ | $Diff_{00}$ | $Diff_{01}$ | $Diff_{02}$ | $Diff_{03}$ | $Diff_{04}$ | $Diff_{05}$ |
| $R_1$ | $Diff_{1-1}$ | $Diff_{10}$ | $Diff_{11}$ | $Diff_{12}$ | $Diff_{13}$ | $Diff_{14}$ | $Diff_{15}$ |
| $R_2$ | $Diff_{2-1}$ | $Diff_{20}$ | $Diff_{21}$ | $Diff_{22}$ | $Diff_{23}$ | $Diff_{24}$ | $Diff_{25}$ |
| $R_3$ | $Diff_{3-1}$ | $Diff_{30}$ | $Diff_{31}$ | $Diff_{32}$ | $Diff_{33}$ | $Diff_{34}$ | $Diff_{35}$ |
| $R_4$ | $Diff_{4-1}$ | $Diff_{40}$ | $Diff_{41}$ | $Diff_{42}$ | $Diff_{43}$ | $Diff_{44}$ | $Diff_{45}$ |

|  | $C_0$ | $C_1$ | $C_2$ | $C_3$ | $C_4$ |
|---|---|---|---|---|---|
| $R_0$ | $Diff_{00}$ | $Diff_{01}$ | $Diff_{02}$ | $Diff_{03}$ | $Diff_{04}$ |
| $R_1$ | $Diff_{10}$ | $Diff_{11}$ | $Diff_{12}$ | $Diff_{13}$ | $Diff_{14}$ |
| $R_2$ | $Diff_{20}$ | $Diff_{21}$ | $Diff_{22}$ | $Diff_{23}$ | $Diff_{24}$ |
| $R_3$ | $Diff_{30}$ | $Diff_{31}$ | $Diff_{32}$ | $Diff_{33}$ | $Diff_{34}$ |
| $R_4$ | $Diff_{40}$ | $Diff_{41}$ | $Diff_{42}$ | $Diff_{43}$ | $Diff_{44}$ |
| $R_5$ | $Diff_{50}$ | $Diff_{51}$ | $Diff_{52}$ | $Diff_{53}$ | $Diff_{54}$ |

|  | $C_0$ | $C_1$ | $C_2$ | $C_3$ | $C_4$ |
|---|---|---|---|---|---|
| $R_{-1}$ | $Diff_{-10}$ | $Diff_{-11}$ | $Diff_{-12}$ | $Diff_{-13}$ | $Diff_{-14}$ |
| $R_0$ | $Diff_{00}$ | $Diff_{01}$ | $Diff_{02}$ | $Diff_{03}$ | $Diff_{04}$ |
| $R_1$ | $Diff_{10}$ | $Diff_{11}$ | $Diff_{12}$ | $Diff_{13}$ | $Diff_{14}$ |
| $R_2$ | $Diff_{20}$ | $Diff_{21}$ | $Diff_{22}$ | $Diff_{23}$ | $Diff_{24}$ |
| $R_3$ | $Diff_{30}$ | $Diff_{31}$ | $Diff_{32}$ | $Diff_{33}$ | $Diff_{34}$ |
| $R_4$ | $Diff_{40}$ | $Diff_{41}$ | $Diff_{42}$ | $Diff_{43}$ | $Diff_{44}$ |
| $R_5$ | $Diff_{50}$ | $Diff_{51}$ | $Diff_{52}$ | $Diff_{53}$ | $Diff_{54}$ |

Figure 7E

METHODS AND DEVICES FOR DETERMINING TOUCH LOCATIONS ON A TOUCH-SENSITIVE SURFACE

RELATED APPLICATIONS

This application claims priority to U.S. Provisional Application Ser. No. 62/197,363, filed Jul. 27, 2015, entitled "Method for Improved Edge Accuracy in a Touchscreen," which is incorporated by reference herein in its entirety.

TECHNICAL FIELD

The disclosed implementations relate generally to touch-sensitive surfaces, and in particular, to improving edge accuracy of a touch-sensitive surface.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device. One type of user interface device that has become more common is a touch-sensitive surface. Touch-sensitive surfaces (also sometimes referred to as panels) include touch screens, touch-sensor pads, touch-sensor sliders, touch-sensor buttons, and touch-sensitive displays. Touch-sensitive surfaces typically include an array of capacitive sensor elements (also referred to as sensor electrodes) and employ capacitive sensing to operate. Capacitive sensing typically involves measuring, through sensor signals (e.g., increases or decreases in electrode responses), a change in capacitance associated with the capacitive sensor elements to determine a presence of a conductive object (e.g., a user's finger or a stylus) relative to the capacitive sensor elements. Changes in capacitance are measured across arrays of sensors when they are used for sensing and processing capacitive touch applications.

A touch on a touch-sensitive surface typically spans multiple sensors to varying degrees. A touch is also sometimes called a contact. Various methods are used to identify the "location" of the touch based on the multiple sensor readings. Some methods identify a sensor whose capacitance change is a local maximum (sometimes called a peak value). Some techniques construct a centroid for the touch, and may use a local maximum to identify a small region for analysis (e.g., a 3×3 or 5×5 grid around the local maximum). When a touch is towards the middle of the array, there are sensors all around the identified local maximum. However, at or near the edge of the array, there are not enough sensors to construct a centroid or to fill out the local region.

Known techniques of identifying the location of touches at or near the edge of a sensor array yield poor performance through poor accuracy and/or precision.

SUMMARY

Disclosed implementations of systems, methods, and devices address the problems associated with identifying the location of touches at or near the edge of a sensor array. Such systems, devices, and methods optionally complement or replace conventional systems, devices, and methods for identifying the location of touches at or near the edge of a sensor array.

In accordance with some implementations, a touch sensing system includes a two-dimensional capacitive sense array including a plurality of capacitive sensors. The touch sensing system also includes a capacitance measurement circuit coupled to the capacitive sense array and configured to measure capacitance changes at each capacitive sensor of the capacitive sense array. The touch sensing system also includes a processing unit coupled to the capacitance measurement circuit. The processing unit is configured to perform a scan of the capacitive sense array to measure capacitance for at least a plurality of the capacitive sensors. The processing unit is also configured to identify a first capacitive sensor whose measured capacitance is a local peak and identify a local rectangular array of capacitive sensors around the first capacitive sensor. For each column of the local rectangular array, the processing unit sums measured capacitances for the capacitive sensors in the column to form a respective column sum. The processing unit determines whether to apply a smoothing algorithm (for the x-coordinate calculation). In some instances, the processing unit determines not to apply a smoothing algorithm, and computes an x-coordinate of a touch using a plurality of the column sums. When the processing unit determines to apply the smoothing algorithm, the processing unit computes the x-coordinate of the touch as an average of two x-coordinate calculations, where each of the two x-coordinate calculations conditionally performs a horizontal shift of the local rectangular array based on comparing the peak measured capacitance of the first capacitive sensor to an adjacent measured capacitance and computes a respective x-coordinate using a respective plurality of the column sums.

In some implementations, each capacitive sensor in the capacitive sense array is associated with a unique location type and determining whether to apply the smoothing algorithm includes determining whether a transition between location types is expected for the touch based on preceding touch measurements.

In some implementations, applying the smoothing algorithm includes, for each of the two x-coordinate calculations: (1) adding a fixed value to a column sum for a column adjacent to the column containing the first capacitive sensor to form a first modified column sum; and (2) subtracting the fixed value from the column sum for the column containing the first capacitive sensor to form a second modified column sum. The smoothing algorithm then performs a horizontal shift when the first modified column sum is greater than the second modified column sum.

In some implementations, each of the two x-coordinate calculations independently applies edge correction. In some implementations, each edge correction calculation is a linear combination of column sums.

In some implementations, the process used to compute an x-coordinate of a touch is applied to row sums to compute a y-coordinate of the touch. In some implementations, for each row of the local rectangular array, the processing unit sums measured capacitances for the capacitive sensors in the row to form a respective row sum. The processing unit determines whether to apply a smoothing algorithm for a y-coordinate calculation. In some instances, the processing unit determines not to apply the smoothing algorithm for the y-coordinate calculation, and computes a y-coordinate of the touch using a plurality of the row sums. When the processing unit determines to apply the smoothing algorithm for the y-coordinate calculation, the processing unit computes the y-coordinate of the touch as an average of two y-coordinate calculations, where each of the two y-coordinate calculations conditionally performs a vertical shift of the local rectangular array based on comparing the peak measured capacitance of the first capacitive sensor to a vertically adjacent measured capacitance and computes a respective y-coordinate using a respective plurality of the row sums.

In some implementations, a method is performed at a touch sensing system that includes a two-dimensional capacitive sense array having a plurality of capacitive sensors. The method includes: (1) in accordance with a determination that a touch is present on the two-dimensional capacitive sense array, summing measured capacitances for the plurality of capacitive sensors; (2) determining whether a smoothing algorithm is to be applied; (3) in accordance with a determination that the smoothing algorithm is not to be applied, generating a centroid for the touch based on the measured capacitances; and (4) in accordance with a determination that the smooth algorithm is to be applied, applying the smoothing algorithm.

According to some implementations, a touch sensing system includes a two-dimensional capacitive sense array. The capacitive sense array includes a plurality of capacitive sensors, arranged in a rectangular shape. In some implementations, the two-dimensional array is non-rectangular (e.g., circular). Each capacitive sensor in the capacitive sense array is associated with a particular location type. In some implementations, the location types include core, inner edge, outer edge, outer corner, and inner corner.

In some implementations, the touch sensing system includes a capacitance measurement circuit coupled to the capacitive sense array. In some implementations, the capacitance measurement circuit is configured to measure capacitance changes at each capacitive sensor of the capacitive sense array. In some implementations, the touch sensing system also includes a memory device that stores one or more adjustment parameters. In some implementations, each adjustment parameter corresponds to one or more of the location types, and is used in identifying touch locations.

In some implementations, the touch sensing system includes a processing unit coupled to the capacitance measurement circuit. In some implementations, the processing unit is configured to receive measured capacitance changes corresponding to a touch on the capacitive sense array and to identify a first capacitive sensor whose measured capacitance change is a local maximum within the capacitance sense array. In some implementations, the processing unit determines a first location type of the first sensor. In some implementations, in accordance with the first location type, the adjustment parameters corresponding to the first location type, and the measured capacitance changes, the processing unit calculates a centroid for the touch.

In some implementations, the adjustment parameters include a first adjustment parameter for inner edges, a second adjustment parameter for outer edges, and a plurality of additional adjustment parameters for corners. In some implementations, the plurality of additional adjustment parameters for corners includes an inner corner adjustment parameter, an outer corner adjustment parameter, an edge corner adjustment parameter, and a corner adjustment parameter.

In some implementations, a method is performed at a touch sensing system that includes a capacitive sense array and one or more processing devices coupled to the capacitive sense array. The processing devices are configured to perform any of the methods described herein.

In some implementations, a non-transitory computer-readable storage medium stores one or more programs configured for execution by one or more processors of a touch sensing system. The one or more programs include instructions for performing any of the methods described herein.

In some implementations, a touch sensing system includes one or more processors and memory coupled to the one or more processors, the memory storing one or more programs configured to be executed by the one or more processors, the one or more programs including instructions for performing any of the methods described herein.

In some implementations, a computing device includes one or more processors and memory coupled to the one or more processors, the memory storing one or more programs configured to be executed by the one or more processors, the one or more programs including instructions for performing any of the methods described herein.

In some implementations, a computing system includes one or more processors and memory coupled to the one or more processors, the memory storing one or more programs configured to be executed by the one or more processors, the one or more programs including instructions for performing any of the methods described herein.

In some implementations, a non-transitory computer-readable storage medium stores one or more programs for execution by one or more processors of a computing system, the one or more programs including instructions for performing any of the methods described herein.

The disclosed techniques increase both the accuracy and precision of touch calculations.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures.

FIG. 4A illustrates location types for sensors in a rectangular array in accordance with some implementations.

FIG. 4B illustrates location types for sensors in a non-rectangular array in accordance with some implementations.

FIG. 5A illustrates a difference array (also sometimes called a difference count array) for use in generating a centroid in accordance with some implementations.

FIGS. 5B-5E illustrate difference arrays involving one or more array edges in accordance with some implementations.

FIGS. 6A-6B illustrate a process of edge correction in accordance with some implementations.

FIGS. 7A-7E illustrate a process of employing a smoothing algorithm in accordance with some implementations.

Like reference numerals refer to corresponding parts throughout the several views of the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the implementations.

DETAILED DESCRIPTION

The various implementations described herein include systems, methods and/or devices used for determining touch locations on a touch-sensitive surface. Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

Figure 1:
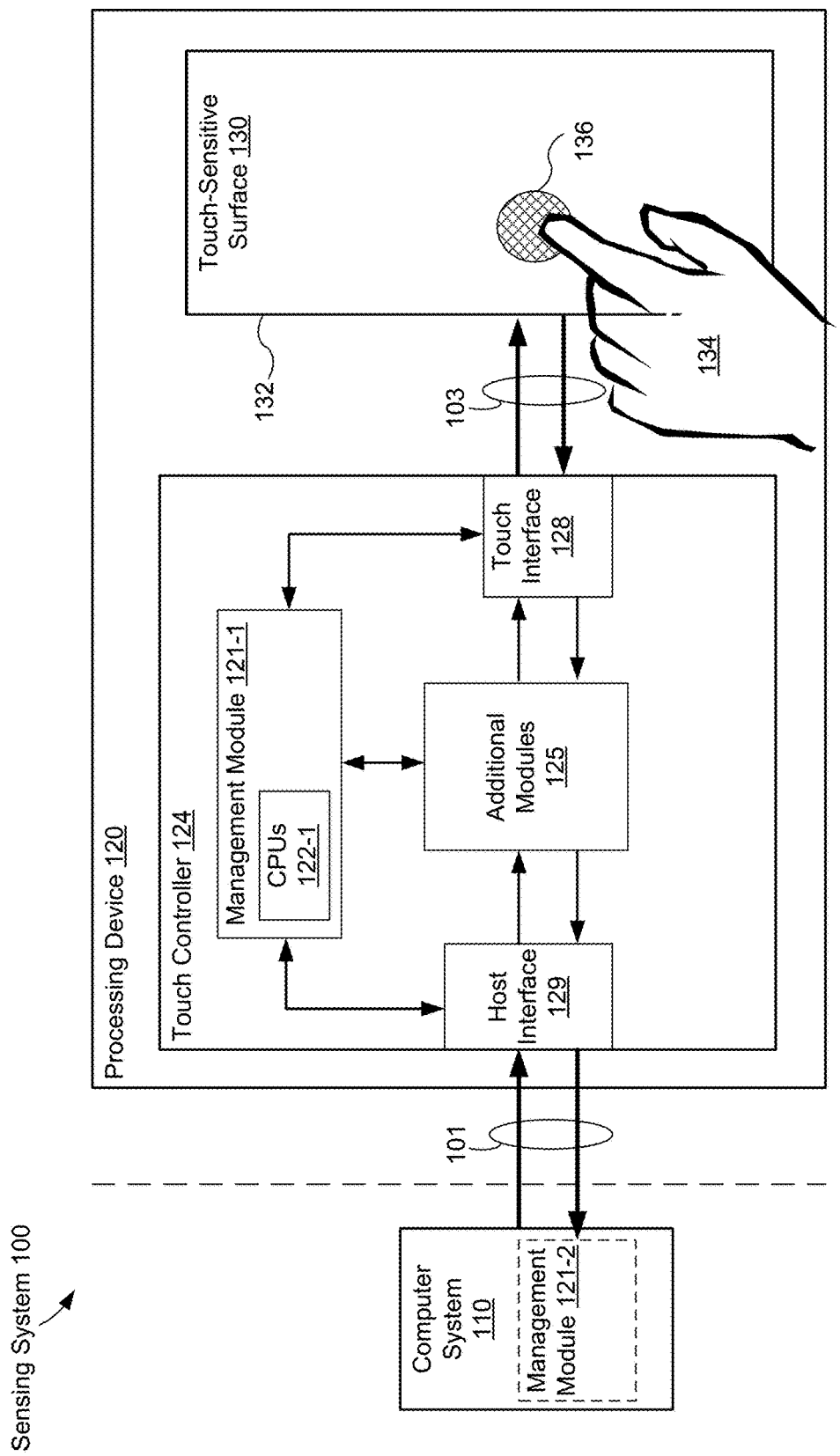
FIG. 1 is a block diagram illustrating a sensing system, in accordance with various implementations.

FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, sensing system 100 includes a processing device 120 (also sometimes called a touch-sensitive device), which includes a touch controller 124 and a touch-sensitive surface 130 (e.g., a touch screen or touch-sensitive display), and is used in conjunction with or includes a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provides some other functionality based on a detection of a user input. In some implementations, the touch-sensitive surface provides the functionality of a proximity sensor.

In some implementations, processing device 120 comprises a mobile device, such as a mobile phone or tablet computer. In some implementations, processing device 120 comprises a wearable device, such as a smart watch or bracelet. In some implementations, sensing system 100 comprises a mobile device or a wearable device.

In some implementations, non-volatile memory in processing device 120 stores the program instructions. In some implementations, the methods described herein are embodied in these program instructions. In some implementations, the processor 122-1 fetches and executes the program instructions. In some implementations, volatile memory is used to store data, including the panel and difference count arrays. In some implementations, a panel sensing electronics block (e.g., touch interface 128) acts as an interface between the touch panel and the processor. In some implementations, under control of the processor, this block scans the touch panel and generates raw data from the panel. In some implementations, the processor manipulates the panel raw data to form the difference count data. In some implementations, the processor is controlled by a host processor. In some implementations, when commanded to do so by the host, the processor performs the finger tracking function, which includes the methods described herein.

The computer system 110 is coupled to the touch controller 124 through data connections 101. In some implementations, connections 101 convey touch data and/or control signals. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110.

The touch-sensitive surface 130 is coupled to the touch controller 124 through the connections 103. In some implementations, connections 103 convey raw sensor data and/or control signals. In some implementations, however, the touch controller 124 and the touch-sensitive surface 130 are included in the same device (i.e., an integrated electronic device) as components thereof. Furthermore, in some implementations, the touch controller 124 and the touch-sensitive surface 130 are embedded in a host device (e.g., computer system 110), such as a mobile device, tablet, other computer or computer controlled device, and the methods described herein are performed, at least in part, by the embedded the touch controller. The touch-sensitive surface 130 includes a sensing array 132 (e.g., a capacitive sense array). In some implementations, the sensing array 132 includes one or more of light-sensitive elements, light emitting elements, photo-sensitive elements, pressure sensitive elements, and/or capacitive sensor elements (also referred to as sensor electrodes). In some implementations, the capacitive sensor elements are electrodes of conductive material, such as copper. The sensing array 132 is sensitive to an input object 134 at a location 136 (e.g., a user's finger or a stylus).

In some implementations, a touch controller 124 includes a management module 121-1, a host interface 129, a touch interface 128, and additional module(s) 125. The touch controller 124 may include various additional features that have not been illustrated for the sake of brevity and so as not to obscure pertinent features of the example implementations disclosed herein, and different arrangements of features may be used. The host interface 129 provides an interface to the computer system 110 through the data connections 101. Similarly, the touch interface 128 provides an interface to the touch-sensitive surface 130 though the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like)

configured to detect (or process), via the sensing array 132, a presence of one or more input objects 134 proximate or in contact with one or more sensor electrodes of the sensing array 132. In some implementations, the management module 121-1 performs operations (e.g., scan operations) to sense, via the sensing array 132, signals indicating the presence of the one or more input objects (e.g., input object 134). In some implementations, the management module 121-1 detects a pressure applied to the touch-sensitive surface 130, light (e.g., infrared light) associated with an input object, an image associated with an input object, a capacitance of the sensors and/or a change in capacitance of one or more of the sensor electrodes of the sensing array 132 when an input object is proximate to or in contact with the touch-sensitive surface 130. The sensing ability of the management module 121-1 depends on the type of sensors used in the touch-sensitive surface 130 (e.g., capacitance sensors such as self-capacitance sensors and/or mutual-capacitance sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch interface 128, the host interface 129, and the management module 121-1. As an example, the additional module(s) 125 may include a memory module (e.g., random access memory and/or flash memory). In some implementations, the memory module stores detected electrode responses, electrode response criteria, previously determined baselines, and the like. In some implementations, the additional module(s) 125 include analog and/or digital general purpose input/output ("GPIO") ports. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems) using, in one implementation, configurable user modules ("Ums"). In some implementations, the additional module(s) 125 include an analog block array that is used to implement a variety of analog circuits. The analog block array may also be coupled to the GPIO ports.

Figure 2A:
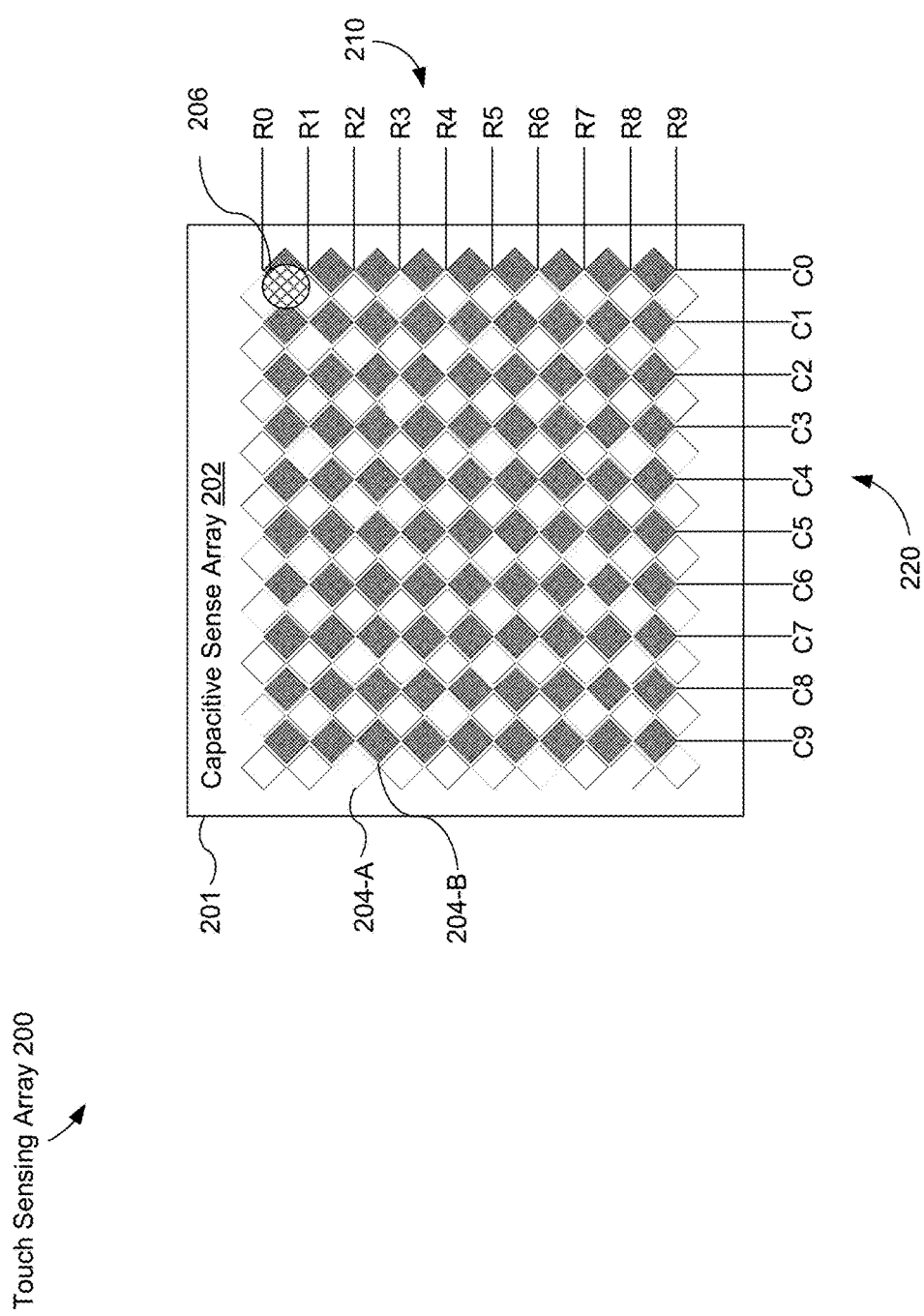
FIG. 2A is a diagram illustrating a touch sensing array including a substrate having a capacitive sense array (e.g., a touch screen), in accordance with various implementations.

FIG. 2A is a diagram illustrating a touch sensing array 200 (e.g., the touch-sensitive surface 130 in FIG. 1) including a substrate 201 (e.g., a dielectric material) having a capacitive sense array 202 (e.g., the sensing array 132 in FIG. 1), in accordance with various implementations. As shown, the capacitive sensor array includes rows R0-R9 210 and columns C0-C9 220 of sensor elements (e.g., sensor elements 204-A, 204-B) arranged in an array. The rows R0-R9 210 and the columns C0-C9 220 of sensor elements are coupled with a sensing module (e.g., a management module 121-1). In the operations described in more detail below, each of the rows R0-R9 210 and columns C0-C9 220 of sensor elements may operate as both transmit and receive electrodes.

In some implementations, the plurality of sensor electrodes 204 (e.g., electrodes 204-A and 204-B) includes both self-capacitance sensors and mutual-capacitance sensors. Within the capacitive sense array 202, each of the rows R0-R9 210 of the sensor elements 204 crosses with each of the columns C0-C9 220 of the sensor elements 204. In this way, galvanic isolation is maintained between the rows R0-R9 210 and the columns C0-C9 220. In some implementations, each of the columns C0-C9 220 is associated with an X-coordinate or range of X-coordinates of the X-Y plane and each of the rows R0-R9 210 is associated with a Y-coordinate or range of Y-coordinates of the X-Y plane. In this way, the sensing module can determine a location (e.g., the touch location 136 in FIG. 1) of a touch 206 on the capacitive sense array 202 using X and Y coordinates of the touch 206.

It should be understood that although the plurality of sensor electrodes 204 are shown to be diamond shaped, one or more of the sensor elements 204 are optionally formed of other shapes (e.g., lines, stripes, bars, triangles, snowflakes, and/or any other shape) and can be organized in various other patterns (e.g., intersections, concentric circles, saw tooth pattern, Manhattan pattern, and/or other patterns) without departing from the claimed subject matter. In some implementations, the sensor elements 204 cover all or a portion of the surface area of the substrate 201. In some implementations, the sensor elements 204 and patterns of the sensor elements 204 are formed on or through one or more layers on the substrate 201.

It should also be understood that although the capacitive sense array 202 illustrated includes a same number of rows and columns, the capacitive sense array optionally includes a different number of rows and columns (e.g., 10 rows and 5 columns). Moreover, although the capacitive sense array 202 illustrated includes a same number of elements in each column of C0-C9 220, the capacitive sense array optionally includes different numbers of sense elements in each column, or in a subset of the columns. For example, in one implementation, C0 consists of 10 elements, C1 consists of 8 elements, C2 consists of 10 elements, C3 consists of 12 elements, C4 consists of 10 elements, C5 consists of 15 elements, and so on. Similarly, the capacitive sense array optionally includes different numbers of elements in each row, or in a subset of the rows.

In some implementations, a processing device (or one or more components of the processing device) measures capacitance of the plurality of sensor electrodes 204 using self-capacitance sensing. In some implementations, self-capacitance sensing measures added (or subtracted) capacitance at each of the plurality of sensor electrodes 204. For example, a user's touch (e.g., a finger) at a specific sensor electrode increases capacitance at the specific sensor electrode because the finger's capacitance is added to the capacitance of the specific sensor electrode. The processing device detects a "touch" when the added capacitance to the specific sensor electrode, relative to a baseline, exceeds a predefined threshold.

In some implementations, the processing device measures capacitance of the plurality of sensor electrodes 204 using mutual-capacitance sensing. In some implementations, mutual-capacitance sensing measures capacitance between a column electrode (e.g., a transmitter (TX) electrode), and a row electrode (e.g., a receiver (RX) electrode). For example, mutual-capacitance sensing measures a change (e.g., a decrease or increase) in capacitance between the column electrode and the row electrode resulting from a user's touch.

Figure 2B:
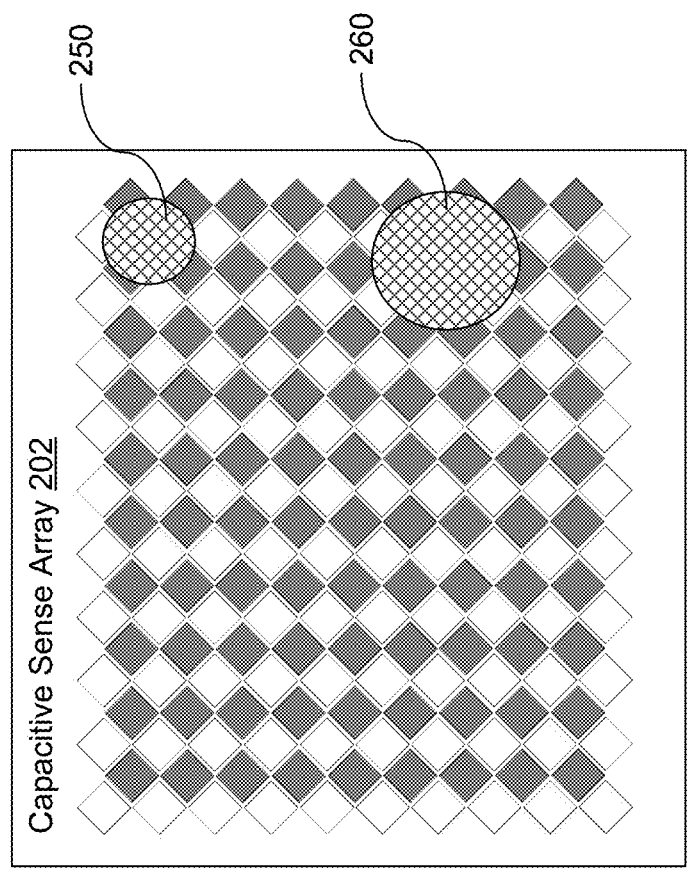
FIG. 2B illustrates a touch sensing array detecting touches of varying sizes, in accordance with various implementations.

FIG. 2B illustrates a touch sensing array 202 detecting touches of varying sizes, in accordance with various implementations. FIG. 2B shows touch sensing array 202 detecting a touch 250 having a first size and detecting another touch 260 having a second size, greater than the first size.

One of the primary limitations on increasing the sensor pitch is the inability to determine the finger size. If the finger size is known, correction equations that are tailored to specific finger sizes are optionally employed. In some implementations, the edge correction methods described herein use edge correction equations that detect touch size. In some implementations, this is achieved by detecting the difference counts on neighboring columns. In some implementations, a difference count comprises the signal sense on a particular element (or set of elements) of the sense array. In some implementations, the difference count comprises a difference between a baseline value and a present value for a given element (or set of elements) on of the sense array. In instances where the touch size is small, the difference counts on the neighboring column are low or zero. In instances where the touch size is larger, the difference counts are higher. In some implementations, touch size is determined for touch sizes ranging from 1 sensor to the entire touch sensing array.

Figure 3:
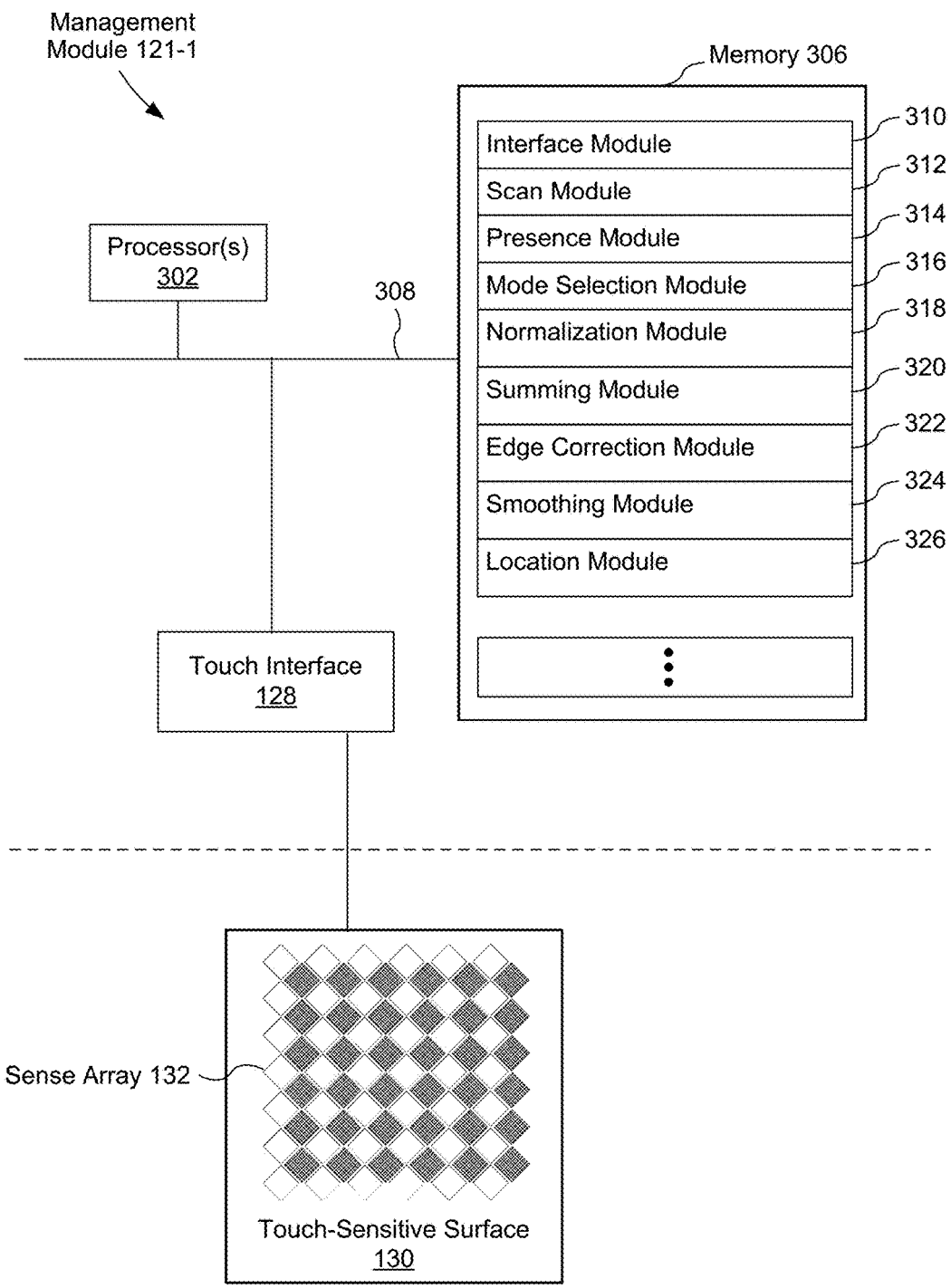
FIG. 3 is a block diagram illustrating an implementation of a management module.

FIG. 3 is a block diagram illustrating an implementation of a management module. The management module 121-1 typically includes one or more processing units 302 for executing modules, programs, and/or instructions stored in the memory 306 and thereby performing processing operations, and one or more communication buses 308 for interconnecting these components. The communication buses 308 optionally include circuitry (sometimes called a chipset) that interconnects and controls communications between system components. In some implementations, the management module 121-1 is coupled to a touch-sensitive surface by the communication buses 308 and the touch interface 128. In some implementations, the memory 306, or the computer-readable storage medium of the memory 306 stores the following modules and data used by the modules:
- an interface module 310, which is used for communicating with other components of the electronic device.
- a scan module 312, which is used to convert sensor signals (e.g., convert analog signals, such as voltage and/or change, into digital signals, or vice versa);
- a presence module 314, which is used to detect presence of a conductive object (e.g., a user's finger), or lack of a conductive object;
- a mode selection module 316, which is used to select a mode of operation of the electronic device based on electrode responses from the sense array;
- a normalization module 318, which is used to normalize electrode responses from the capacitive sense array (i.e., establish a new baseline);
- a summing module 320, which is used to determine row and/or column difference sums based on electrode responses from the sense array;
- an edge correction module 322, which is used to generate edge corrections for conductive objects at or near an edge of a touch-sensitive surface;
- a smoothing module 324, which is used to smooth transitions (e.g., reduce jitter) for conductive objects moving at or near an edge of a touch-sensitive surface; and
- a location module 326, which is used to determine the location of conductive objects on a touch-sensitive surface (e.g., touch-sensitive surface 130), optionally including a centroid sub-module (not shown) for generating centroids corresponding to the conductive objects.

In some implementations, the scan module 312 uses a multiplexer or switch matrix (not shown) to distribute signals to one or more sensor electrodes. In some implementations, the scan module 312 uses the same or a different multiplexer (not shown) to receive current from the one or more sensor electrodes. This configuration allows the scan module 312 to scan all or specific portions of the capacitive sense array. In some implementations, scanning specific portions of the capacitive sense array (e.g., corner portions) consumes less energy compared to scanning the entire capacitive sensor array. In some implementations, scanning specific portions of the capacitive sense array takes less time compared to scanning the entire capacitive sensor array.

Each of the above identified elements may be stored in one or more memory devices that together form the memory 306, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 306 stores a subset of the modules and data structures identified above. Furthermore, the memory 306 may store additional modules and data structures not described above. For example, in some implementations, the memory 306 stores detected electrode responses, electrode response criteria, previously determined baselines, a water detection algorithm, a wipe detection algorithm, and other relevant information. In some implementations, the programs, modules, and data structures stored in memory 306, or the computer-readable storage medium of the memory 306, provide instructions for implementing respective operations in the methods described herein.

FIG. 4A illustrates example location types for sensors in a rectangular array in accordance with some implementations. In this example, the central sensors are labeled as "core." These are the sensors that are at least two sensors away from any edge. There are four "corners" and four rows/columns of outer edge sensors. In addition, there is a rectangular ring of "inner edge" sensors that are adjacent to the outer edge.

The calculation of a centroid for a touch depends on whether the finger location is at a Corner, an OuterEdge, an InnerEdge, or the Core area. For the core area, it is reasonably easy to compute a centroid because there are enough surrounding sensor readings. To report accurate and precise edge/corner coordinates at other locations, implementations use edge correction (also sometimes called edge compensation) and/or smoothing techniques. In some implementations, an electronic device, such as processing device 120 (FIG. 1), includes a touch-sensitive surface consisting of mostly edge-type locations (e.g., inner edge or outer edge). For example, a touch-sensitive surface consisting of 70%, 80%, or 90% edge-type locations. In some implementations, a centroid is constructed using a centroid equation or algorithm. In some implementations, the centroid equation uses difference count data and an element index to determine a touch location on a particular axis.

FIG. 4B illustrates location types for sensors in a non-rectangular array in accordance with some implementations. In this example, there are five types of touch locations: Corner (sometimes referred to as an "Outer Corner"), Inner-Corner, OuterEdge, InnerEdge, and Core. As with a rectangular array, the Core sensors have at least two actual sensors on all sides. For the other location types, implementations use edge correction and/or smoothing techniques to generate accurate and precise centroids.

FIG. 5A illustrates a difference array 500 for use in generating a centroid in accordance with some implementations. The difference array 500 comprises a 5×5 array with 5 rows ($R_0$-$R_4$) and 5 columns ($C_0$-$C_4$). A difference array that spans an entire touch-sensitive surface is also sometimes called a panel array. Each element in the difference array 500 ($Diff_{00}$-$Diff_{44}$) represents a difference count corresponding to one or more sensors in a sense array (e.g., capacitive sense array 202, FIG. 2A). In some implementations, a difference count represents the difference in capacitance measured when a touch is present and when a touch is not present. In some implementations, the element in the center of the difference array 500 (i.e., $Diff_{22}$) has a local maximum (or peak) value. In some implementations, an element index is utilized to denote the location of the element within the sense array along a particular axis (e.g., x-axis or y-axis).

The difference array 500 in FIG. 5A shows the relationship between the difference counts ($Diff_{ij}$) and the corresponding row and column sums ($R_i$ and $C_j$). In some implementations, a column sum is calculated using Equation 1:

$Column_i = Diff_{0i} + Diff_{1i} +$
$Diff_{2i} + Diff_{3i} + Diff_{4i}$  Equation 1—calculating a column sum For example, the column sum $C_1$ is $Diff_{01} + Diff_{11} + Diff_{21} + Diff_{31} + Diff_{41}$. In some implementations, the difference count array is a subset of the panel array. In some implementations, $Diff_{22}$ is a local peak value in the panel array. In some implementations, if the difference count array extends beyond the edge of the larger panel array, then the missing difference counts are set to zero (before performing edge correction).

In some implementations, a location on a particular axis is calculated using a centroid equation, such as Equation 2:

$Position_x = RES*(E_i + 0.5 + ((2*(C_4 - C_0) + (C_3 - C_1))/(C_0 + C_1 + C_2 + C_3 + C_4))$  Equation 2—calculating an x-axis centroid In some implementations, Equation 2 is used to calculate a location on the x-axis. In Equation 2, $C_i$ is a column sum, RES is a predetermined constant based on the sense array resolution, and $E_i$ is the element index (e.g., horizontal position within the entire sense array). In some implementations, a location on the y-axis is calculated using Equation 3:

$Position_y = RES*(E_i + 0.5 + ((2*(R_4 - R_0) + (R_3 - R_1))/(R_0 + R_1 + R_2 + R_3 + R_4))$  Equation 3—calculating a y-axis centroid In some implementations, an X position operation uses only the element index to determine which edge correction operation to apply. In some implementations, if the element index shows that the peak is on an edge element, then the location is classified as "outer edge". In some implementations, if the peak is one element in from the edge, then the location is classified as "inner edge." Otherwise, the location is classified as core and no edge correction is performed. In some implementations, in the case of inner and outer edge elements, edge correction is performed using the difference counts.

FIGS. 5B-5E illustrate difference arrays involving one or more array edges in accordance with some implementations. FIG. 5B illustrates a difference array 510 corresponding to a touch near the left edge of a sense array. In FIG. 5B the column $C_0$ is filled with zeroes because it is outside the sense array and thus has no difference counts. In FIG. 5B the local maximum ($Diff_{22}$) occurs at an inner edge location type (e.g., InnerEdge, FIG. 4A).

FIG. 5C illustrates a difference array 520 corresponding to a touch near the top edge of a sense array. In FIG. 5C rows $R_0$ and $R_1$ are filled with zeroes because they are outside the sense array and thus have no difference counts. In FIG. 5C the local maximum ($Diff_{22}$) occurs at an outer edge location type (e.g., OuterEdge, FIG. 4A).

FIG. 5D illustrates a difference array 530 corresponding to a touch near the top-left corner of a sense array. In FIG. 5D the column $C_0$ and the row $R_0$ are filled with zeroes because they are outside the sense array and thus have no difference counts. In FIG. 5D the local maximum ($Diff_{22}$) occurs at an inner edge location type (e.g., InnerEdge, FIG. 4A).

FIG. 5E illustrates a difference array 540 corresponding to a touch near the left edge and right edge of a sense array (e.g., a touch on a sense array having only 3 columns). In FIG. 5E the columns $C_0$ and $C_4$ are filled with zeroes because they are outside the sense array and thus have no difference counts. In FIG. 5E the local maximum ($Diff_{22}$) occurs at an inner edge location type (e.g., InnerEdge, FIG. 4A).

FIGS. 6A-6B illustrate a process of edge correction in accordance with some implementations. FIG. 6A shows a difference array 600 corresponding to a touch near the left edge and right edge of a sense array. In FIG. 6A the columns $C_0$ and $C_4$ are filled with zeroes because they are outside the sense array and thus have no difference counts.

FIG. 6B shows columns $C_0$ and $C_4$ populated with values from edge correction operations. In some implementations, an edge correction operation is performed on one column (e.g., $C_0$) independently of an edge correction operation performed on the other column (e.g., $C_1$). In some implementations, an edge correction operation is performed on one column (e.g., $C_4$) and mirrored for the other column (e.g., $C_0$). In some implementations, edge correction generates virtual sensors. In some implementations, edge correction uses a linear combination of column sums. In some implementations, non-linear equations are utilized to perform edge correction. In some implementations, individual difference count values are used in the edge correction equations. Some techniques of performing edge correction are described in application Ser. No. 15/090,578, filed Apr. 4, 2016, entitled "Virtual Sensor Mirroring for Circular Touch Panels," which is hereby incorporated by reference in its entirety.

FIGS. 7A-7E illustrate a process of employing a smoothing algorithm in accordance with some implementations. FIG. 7A shows a difference array 700. The difference array 700 comprises a 5×5 array with 5 rows ($R_0$-$R_4$) and 5 columns ($C_0$-$C_4$). Each element in the difference array 700 ($Diff_{00}$-$Diff_{44}$) represents a difference count corresponding to one or more sensors in a sense array (e.g., capacitive sense array 202, FIG. 2A). In some implementations, a difference count represents the difference in capacitance measured when a touch is present and when a touch is not present. In some implementations, the element in the center of the difference array 700 ($Diff_{22}$) represents a local maximum value. In some instances, applying a smoothing algorithm prevents or reduces jump-backs (changes in direction) when moving a contact near an edge of the sensor array. In some implementations, applying a smoothing algorithm increases accuracy and precision of contact location calculations when the contact is near an edge.

FIG. 7B shows a difference array 710 including an additional column $C_5$. In some implementations, the values in column $C_5$ ($Diff_{05}$-$Diff_{45}$) are generated as part of a smoothing operation (e.g., a smoothing operation performed on the difference array 700). In some implementations, the values in column $C_5$ ($Diff_{05}$-$Diff_{45}$) are generated as part of a shift-right-and-edge-correct operation. In some implementations, the column sum for the column $C_5$ is a linear combination of column sums for the difference array 700.

FIG. 7C shows a difference array 720 including an additional column $C_{-1}$. In some implementations, the values in column $C_{-1}$ ($Diff_{0-1}$-$Diff_{4-1}$) are generated as part of a smoothing operation (e.g., a smoothing operation performed on the difference array 710). In some implementations, the values in column $C_{-1}$ ($Diff_{0-1}$-$Diff_{4-1}$) are generated as part of a shift-left-and-edge-correct operation. In some implementations, the column sum for the column $C_{-1}$ is a linear combination of column sums for the difference array 700 or the difference array 710.

FIG. 7D shows a difference array 730 including an additional row $R_5$. In some implementations, the values in row $R_5$ ($Diff_{50}$-$Diff_{54}$) are generated as part of a smoothing operation (e.g., a smoothing operation performed on the difference array 700). In some implementations, the values in row $R_5$ ($Diff_{50}$-$Diff_{54}$) are generated as part of a shift-down-and-edge-correct operation. In some implementations, the row sum for the row $R_5$ is a linear combination of row sums for the difference array 700.

FIG. 7E shows a difference array 740 including an additional row $R_{-1}$. In some implementations, the values in row $R_{-1}$ ($Diff_{-10}$-$Diff_{-14}$) are generated as part of a smoothing operation (e.g., a smoothing operation performed on the difference array 730). In some implementations, the values in row $R_{-1}$ ($Diff_{-10}$-$Diff_{-14}$) are generated as part of a shift-up-and-edge-correct operation. In some implementations, the row sum for the row $R_{-1}$ is a linear combination of row sums for the difference array 700 or the difference array 730.

Representative Processes

Figure 8:
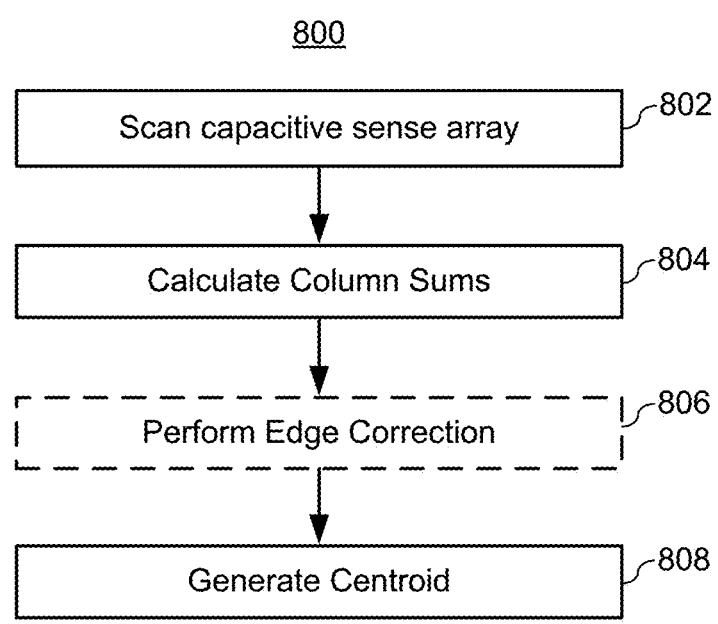
FIG. 8 is a flowchart representation of a method for determining touch locations on a touch-sensitive surface in accordance with some implementations.
Figure 9:
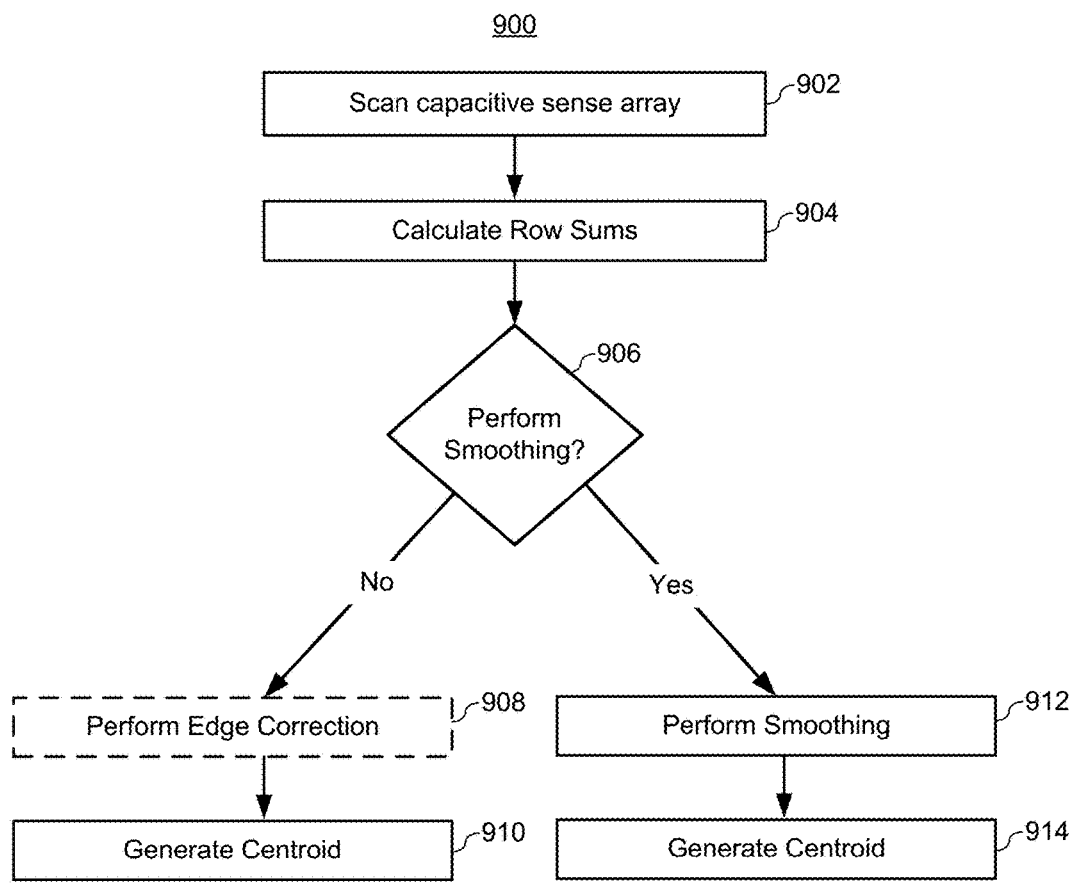
FIG. 9 is a flowchart representation of a method for determining touch locations on a touch-sensitive surface in accordance with some implementations.
Figure 10:
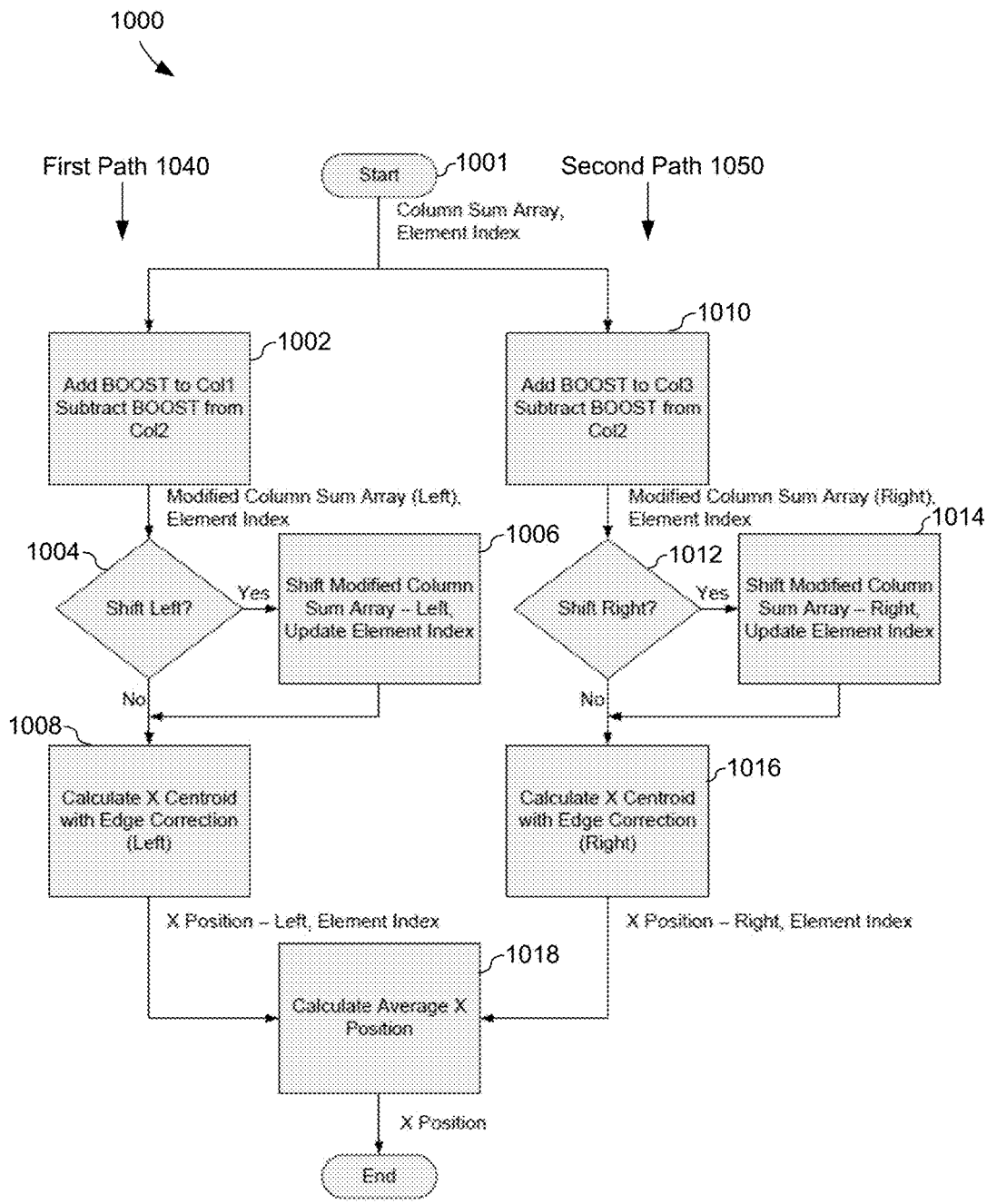
FIG. 10 is a flowchart representation of a method for performing a smoothing operation to determine a touch location in accordance with some implementations.

Attention is now directed to the flowcharts in FIGS. 8, 9, and 10. FIG. 8 provides a flowchart of a method 800 for determining touch locations on a touch-sensitive surface in accordance with some implementations. FIG. 9 provides a flowchart of a method 900 for determining touch locations on a touch-sensitive surface in accordance with some implementations. FIG. 10 provides a flowchart of a method 1000 for performing a smoothing operation to determine a touch location in accordance with some implementations.

In some implementations, the methods 800, 900, and 1000 are performed by: (1) one or more electronic devices, such as processing device 120; (2) one or more computing systems, such as sensing system 100; or (3) a combination thereof. Thus, in some implementations, the operations of the methods 800, 900, and 1000 described herein are entirely interchangeable, and respective operations of the methods 800, 900, and 1000 are performed by any of the aforementioned devices, systems, or combination of devices and/or systems. In some implementations, the methods 800, 900, and 1000 are governed by instructions that are stored in a non-transitory computer-readable storage medium and that are executed by one or more processors of a device/computing system (e.g., one or more processors 302 of a management module 121-1 and/or the one or more processors of a computer system 110). For convenience, methods 800, 900, and 1000 will be described below as being performed by an electronic device, such as processing device 120.

FIG. 8 provides a flowchart of a method 800 for determining touch locations on a touch-sensitive surface in accordance with some implementations. The device scans (802) the sense array. In some implementations, the scan senses, via the sensing array 132, signals indicating the presence of the one or more input objects (e.g., input object 134). In some implementations, the device utilizes scan module 312 and/or presence module 314 to scan the sense array. In some implementations, scanning includes converting sensor signals from the sensor array. In some implementations, the scanning includes: (1) obtaining a baseline value for each sensor of the sense array, where the baseline value is a value for the sensor when no conductive object (e.g., touch contact) is present; (2) obtaining a present value from each sensor; and (3) comparing the present values to the baseline values to determine if a conductive object is present at any sensor in the sense array (e.g., computing differences). In some implementations, the device utilizes a normalization module 318 to obtain the baseline values. In some implementations, based on the scan, the device determines whether a conductive object is present (e.g., utilizing presence module 314). In some implementations, the device generates a difference array (e.g., a difference array 500 as illustrated in FIG. 5A) based on the scan. In some implementations, each time the panel is scanned, a difference count array is generated.

The device calculates (804) a plurality of column sums for a region around a sensor with a peak (local maximum) capacitance change. As illustrated above, the region is commonly a 5×5 array centered on the peak. In some implementations, the device calculates the plurality of column sums in accordance with a determination that a conductive object is present. In some implementations, the device utilizes a summing module 320 and/or edge correction module 322 to calculate the plurality of column sums. In some implementations, the device generates a difference array for each detected local maximum (e.g., a difference array 500 as illustrated in FIG. 5A). In some implementations, calculating the plurality of column sums comprises calculating a column sum for each column in the difference array. In some implementations, the device generates a column sum array based on the calculated plurality of column sums. In some implementations, calculating the plurality of column sums uses Equation 1 above.

In some implementations, the device performs (806) edge correction. In some implementations, the device uses an edge correction module 322 to perform the edge correction. In some implementations, as shown in FIGS. 6A-6B, edge correction includes generating a plurality of values for a column or row of a difference array that does not have actual difference values (e.g., because the column/row does not correspond to a portion of the sense array). In some implementations, edge correction is applied solely to column sums (or row sums) instead of individual values. In some implementations, the device generates an updated difference array based on the edge correction. In some implementations, edge correction generates virtual sensors. In some implementations, edge correction uses a linear combination of column sums. For example, in some implementations edge correction uses a linear combination of the column sums calculated in operation 804. In some implementations, individual difference count values are used in the edge correction equations. In some implementations, non-linear equations are utilized to perform edge correction.

The device generates (808) a centroid. In some implementations, the device utilizes a location module 326 to generate the centroid. In some implementations, the device generates the centroid based on the edge correction. In some implementations, the device generates the centroid based on the calculated column sums. In some implementations, the device generates the centroid based on a difference array. In some implementations, the device generates the centroid based on an updated difference array resulting from edge correction. In some implementations, generating the centroid includes generating a centroid for a particular axis (e.g., an x-axis) for the touch. In some implementations, the device determines a location of the touch based on the centroid. In some implementations, the device utilizes a location module 326 to determine the location of the touch based on the centroid. In some implementations, generating a centroid uses Equation 2 above.

In some implementations, the method 800 is performed with respect to rows rather than columns (typically both are performed). In some implementations, when the method 800 is performed with respect to rows, rather than calculating column sums, the device calculates row sums. In some implementations, a location on an x-axis is calculated by performing method 800 with respect to columns and a location on a y-axis is calculated by performing method 800 with respect to rows. In some implementations, the location on the x-axis and the location on the y-axis are combined to identify a location for the touch on the touch-sensitive surface.

FIG. 9 provides a flowchart of a method 900 for determining touch locations on a touch-sensitive surface in accordance with some implementations. The device scans (902) the sense array. In some implementations, the device utilizes a scan module 312 and/or a presence module 314 to scan the sense array. In some implementations, the scan operation 902 is the same as or similar to the scan operation 802 in FIG. 8. In some implementations, the scanning includes: (1) obtaining a baseline value for each sensor of the sense array, where the baseline value is a value for the sensor when no conductive object (e.g., touch contact) is present; (2) obtaining a present value from each sensor; and (3) computing a difference between the present value and the baseline value to determine if a conductive object is present at any sensor in the sense array. In some implementations, the device generates a difference count array based on the scan.

The device calculates (904) a plurality of row sums (or column sums) for a region around a sensor with a local maximum capacitance measurement. The region is commonly a 5×5 rectangular subarray of sensors. In some implementations, the device calculates the plurality of row sums in accordance with a determination that a conductive object is present. In some implementations, the device utilizes a summing module 320 and/or an edge correction module 322 to calculate the plurality of row sums. In some implementations, the calculation is the same as or similar to the calculation operation 804 in FIG. 8. In some implementations, the device identifies, based on the scan, one or more sensors whose measured capacitances are local maxima. In some implementations, the device generates a difference array for each local maximum (e.g., the difference array 500 in FIG. 5A). In some implementations, calculating the plurality of row sums includes calculating a row sum for each row in the difference array. In some implementations, summing measured capacitances for the plurality of capacitive sensors includes summing a plurality of measured capacitances, where each measured capacitance of the plurality of measured capacitances corresponds to a particular row of a plurality of rows in the sense array. In some implementations, the device generates a row sum array based on the calculated plurality of row sums. In some implementations, calculating the plurality of row sums uses Equation 1 above.

The device determines (906) whether to apply a smoothing operation. In some implementations, the device utilizes a smoothing module 324, a presence module 314, and/or a location module 326 to determine whether to apply the smoothing operation. In some implementations, determining whether to apply the smoothing operation includes determining whether the touch is at or near an edge of the sensing array. For example, determining whether a touch is located at an OuterEdge, Corner, or InnerEdge in FIG. 4A. In some implementations, determining whether to apply the smoothing operation includes determining whether the touch is moving at or near an edge of the sensing array. For example, determining whether a touch is moving toward an InnerEdge from another location type, such as the Core, in FIG. 4A. In some implementations, when touches or local maxima are located at an OuterEdge, Corner, and/or InnerEdge a smoothing operation is performed. In some implementations, when a touch is moving to, or from, an OuterEdge, Corner, and/or InnerEdge (FIG. 4A) a smoothing operation is performed. In some implementations, determining whether the smoothing algorithm is to be applied includes determining whether a transition between location types is expected for the touch. In some implementations, a smoothing operation is invoked when a transition between two different edge correction equations is expected. In some implementations, the smoothing operation is employed at the transition between the core and the edge of the panel. In some implementations, the smoothing operation is invoked at transition points.

In some implementations, the smoothing operation 912 is performed regardless of whether the touch is detected near an edge of the sensor array. For example, on sensor arrays with a large pitch (e.g., greater than 5 mm), the smoothing operation is performed across the entire sensor array. In some instances, one of the limitations on increasing the sensor pitch is lack of knowledge of finger size. In some instances, if the finger size is known, correction operations that are tailored to specific finger sizes are optionally employed. In some implementations, the methods described herein utilize edge correction operations that determine finger size. In some implementations, finger size is determined by detecting the difference counts on neighboring columns or rows. For example, if the finger size is small, then the difference counts on the neighboring column is zero (or nearly zero). For a larger finger, the difference counts are non-zero.

In some implementations, in accordance with a determination not to apply the smoothing operation, the device performs (908) edge correction. In some implementations, the device utilizes an edge correction module 322 to perform edge correction. In some implementations, the edge correction is the same as or similar to the edge correction operation 806 in FIG. 8. In some implementations, the device generates an updated difference array based on the edge correction operation. In some implementations, edge correction generates virtual sensors. In some implementations, edge correction uses a linear combination of column sums. For example, edge correction uses linear combinations of the column sums calculated in the calculation operation 904. In some implementations, individual difference count values are used in the edge correction equations. In some implementations, non-linear equations are utilized to perform edge correction. In some implementations, edge correction utilizes the column sum array and/or element index.

In accordance with a determination not to apply the smoothing operation, the device generates (910) a centroid. In some implementations, the device utilizes a location module 326 to generate the centroid. In some implementations, the centroid generation is the same as or similar to the centroid generation 808 in FIG. 8. In some implementations, the device generates the centroid based on the edge correction operation. In some implementations, the device generates the centroid based on the calculated column sums. In some implementations, the device generates the centroid based on a difference array. In some implementations, the device generates the centroid based on an updated difference array resulting from an edge correction operation. In some implementations, the device generates the centroid for the touch detected by the sense array (e.g., the touch corresponding to the local maximum in the difference array). In some implementations, the device determines a location of the touch based on the centroid. In some implementations, the device utilizes a location module 326 to determine the location of the touch based on the centroid. In some implementations, generating the centroid uses Equation 3 above in conjunction with column sums (e.g., column sums updated after performing edge correction) and the element index.

In accordance with a determination to apply the smoothing operation, the device performs (912) the smoothing operation. In some implementations, the device utilizes a smoothing module 324 to perform the smoothing operation. In some implementations, performing the smoothing operation includes smoothing transitions for conductive objects moving at or near an edge of a touch-sensitive surface. In some implementations, performing the smoothing operation includes: (1) adding a fixed value (e.g., a predetermined constant) to a column sum for a column adjacent to a column containing the peak value for the touch (e.g., column $C_1$ in FIG. 6A); and (2) subtracting the fixed value from a column sum for the column containing the peak value for the touch (e.g., column $C_2$ in FIG. 6A). In some implementations, performing the smoothing operation includes: (1) generating a plurality of centroids, where each centroid of the plurality of centroids uses distinct edge correction equation; and (2) identifying a location for the touch based on the plurality of centroids. In some implementations, performing the smoothing operation includes the process illustrated in FIG. 10 below. For example, FIGS. 6A-6B show a difference array being updated due to application of a smoothing operation. In some implementations, performing a smoothing operation includes augmenting the column sum array by one or more elements. In some implementations, these additional elements are employed when shifting is used in the smoothing algorithm.

In some implementations, performing the smoothing operation includes performing one or more edge correction operations. In some implementations, as compared to the edge correction operation in method 800, the edge correction operations employed are simpler, but more numerous. In some implementations, the inner and outer edge correction operations used in the method 800 are replaced with at least four distinct edge correction operations. In some implementations, each of these edge correction operations uses a linear combination of column sums. In some implementations, the output of the edge correction operation is added to a column sum that would otherwise be set to zero, because it is positioned off of the edge of the panel.

After performing the smoothing operation, the device generates (914) a centroid. In some implementations, the device uses a location module 326 to generate the centroid. In some implementations, the centroid generation 914 is the same as or similar to the centroid generation 808 in FIG. 8. In some implementations, the device generates the centroid based on the smoothing operation. In some implementations, the device generates the centroid based on an updated difference array resulting from the smoothing operation. In some implementations, the device generates the centroid for the touch detected by the sense array (e.g., the touch corresponding to the local maximum in the difference array). In some implementations, the device determines a location of the touch based on the centroid. In some implementations, the device utilizes a location module 326 to determine the location of the touch based on the centroid. In some implementations, the device generates a plurality of centroids and determines the location of the touch based on the plurality of centroids. In some implementations, generating the centroid uses Equation 3 above in conjunction with column sums (e.g., column sums updated after the smoothing operation) and the element index.

In some implementations, an improved edge correction method is employed. In some implementations, the improved edge correction method has two parts. First, a number of edge correction operations are applied to improve accuracy when the touch is positioned near the sense array's edge. In some implementations, these edge correction operations use the difference counts as inputs and are invoked based on both the element index and the difference count data. In some implementations, the edge correction operations use linear combinations of difference count data. In some implementations, the output of the edge correction operation is used as an additional input to a centroid generation operation. Second, a smoothing operation is used to smooth transitions between different edge correction operations. In some implementations, the smoothing operation allows each edge correction operation to be defined without regard to its neighboring equations. In the absence of the smoothing operation, the edge correction operations would have to be designed to minimize discontinuities when transitioning from one operation to another. This requirement would over-constrain the edge correction operations. In some instances, the smoothing algorithm also serves to reduce position jitter that can occur when a touch is positioned at the transition between two different edge correction equations. In some instances, a small amount of noise in the difference counts can result in rapid switching between the two edge correction operations and large displacements.

In some implementations, the method 900 is performed with respect to columns rather than rows. In some implementations, when the method 900 is performed with respect to columns, rather than calculating row sums, the device calculates column sums. In some implementations, a location on a y-axis is calculated by performing the method 900 with respect to rows and a location on an x-axis is calculated by performing the method 900 with respect to columns. In some implementations, the location on the x-axis and the location on the y-axis are combined to determine a location for the touch on the touch-sensitive surface.

FIG. 10 provides a flowchart of a method 1000 for performing a smoothing operation to determine a touch location in accordance with some implementations. The device obtains (1001) a column sum array for a region around a local maximum capacitance measurement. The element index values identify the location of each sensor of the region within the overall sensor array. In some implementations, obtaining the column sum array includes calculating the column sum array based on the measurements for individual sensors (e.g., calculating (804) column sums as illustrated in FIG. 8).

The process then proceeds along two paths 1040 and 1050, which may be executed concurrently. Maintaining consistency with FIG. 7A, the column containing the local maximum will be referred to as the "second column," with associated second column sum $C_2$. The column to the left of the second column will be referred to as the "first column," with first column sum $C_1$. Similarly, the column to the right of the second column will be referred to as the "third column," with third column sum $C_3$.

In the first path, the device subtracts (1002) a predetermined value (e.g., denoted BOOST) from the second column sum and adds the predetermined value to the first column sum. In some implementations, the device utilizes a smoothing module 324 and/or a summing module 320 to subtract and/or add the predetermined value. When applied to rows, the device subtracts the predetermined value from the row containing the local maximum (e.g., row $R_2$), and adds the predetermined value to an adjacent row (e.g., row $R_3$). Because the 4 fixed value is added to one column and subtracted from another column, the denominator of a centroid equation 2 above is unchanged.

The device determines (1004) whether to perform a shift-left operation. In some implementations, the device uses the smoothing module 324 to determine whether to perform the shift-left operation. In some implementations, the device determines whether to perform the shift-left operation based on the location of the local maximum after performing the BOOST operation 1002. For example, suppose the first column sum $C_1$ is 42, the second column sum $C_2$ is 50, and the predetermined BOOST value is 5. After the BOOST operation, the first column sum $C_1$ is 47 and the second column sum $C_2$ is 45, putting the local maximum in the first column. In this case, a shift left is performed. However, if the first column sum $C_1$ were initially only 36, and the same BOOST value was used, the modified first column sum $C_1$ is only 41, less than the modified second column sum of 45. In this latter case, a shift left is not performed because the local maximum is still in the second column.

In accordance with a determination to perform the shift-left operation, the device performs (1006) the shift-left operation to generate shifted data. In some implementations, the device utilizes the smoothing module 324 to perform the shift-left operation. In some implementations, the shift reassigns the column sums such that the modified peak value (at $C_3$) is moved to the $C_2$ position. In some implementations, the horizontal element index is decremented. In some implementations, performing the shift-left operation comprises, after reassigning the column sums, performing an edge correction operation, such as edge correction operation 806 in FIG. 8. For example, FIG. 7C shows a difference array 720 with an additional column $C_{-1}$ as a result of performing a shift-left operation with edge correction. In some implementations, performing the shift-left operation comprises generating one or more updated column sums.

After performing the shift-left operation (or not), the device generates (1008) a (horizontal) centroid based on the updated data (which may be shifted). In some implementations, the centroid is generated in a similar manner as described above with respect to centroid generation 808 FIG. 8 and centroid generation 914 in FIG. 9. In some implementations, the device utilizes location module 326 (FIG. 3) to generate the centroid. In some implementations, the device generates the centroid based on an updated difference array resulting from the shift-left operation. In some implementations, the standard centroid operation with edge correction is performed. In some implementations, the device uses Equation 2 above to generate the centroid. In some instances, since the smoothing operation is invoked at transition points, it is expected that different edge correction equations will be invoked in the left path 1040 and the right path 1050.

In the second path 1050, the device subtracts (1010) a predetermined value (e.g., denoted BOOST) from the second column sum and adds the predetermined value to the third column sum. In some implementations, the subtraction and addition operations 1010 are performed in a similar manner as described above with respect to the addition and subtraction operations 1002. In some implementations, the device uses a smoothing module 324 and/or a summing module 320 to subtract and/or add the predetermined value.

In some implementations, the right path addition and subtraction operations 1010 are performed after the left path addition and subtraction operations 1002 or after the left path centroid calculation 1008. In some implementations, the right path 1050 is performed independently of left path 1040. For example, operations 1002-1008 are performed by one thread in a processor and operations 1010-1016 are performed by another thread in the processor. In some implementations, the right path 1050 is executed before the left path 1040.

The device determines (1012) whether to perform a shift-right operation. In some implementations, the device uses a smoothing module 324 to determine whether to perform the shift-right operation. In some implementations, the determination whether to perform the shift-right decision is determined in a similar manner as described above with respect to the shift-left decision 1004. In some implementations, the device determines whether to perform the shift-right operation based on the location of the local maximum after performing the BOOST operation 1010.

In accordance with a determination to perform the shift-right operation, the device performs (1014) the shift-right operation to generate shifted data. In some implementations, the device utilizes a smoothing module 324 to perform the shift-right operation. In some implementations, the shift-right operation is performed in a similar manner as described above with respect to the shift-left operation 1006. In some implementations, the shift reassigns the column sums such that the modified peak value is moved to the $C_2$ position. In some implementations, the element index is incremented. In some implementations, performing the shift-right operation comprises, after reassigning the column sums, performing edge correction, such as the edge correction operation 806 in FIG. 8. For example, FIG. 7B shows a difference array 710 with an additional column $C_5$ as a result of performing a shift-right operation with edge correction. In some implementations, performing the shift-right operation comprises generating one or more updated column sums.

After performing the shift-right operation (or not), the device generates (1016) a centroid based on the updated data (which may be shifted). In some implementations, the centroid is generated in a similar manner as described above with respect to centroid calculation 1008. In some implementations, the device utilizes a location module 326 to generate the centroid. In some implementations, the device generates the centroid based on an updated difference array resulting from the shift-right operation.

The device then combines the two centroid calculations to compute a final x-position. The device calculates (1018) a location for the touch based on the generated centroids. In some implementations, the device calculates a location on an x-axis based on the generated centroids. In some implementations, the device utilizes a location module 326 to calculate the location for the touch. In some implementations, calculating the location for the touch based on the generated centroids comprises calculating an average position based on the centroids. In some implementations, the centroids of the left and right branches are averaged together to yield a final x-axis position.

In some implementations, the method 1000 is performed with respect to rows rather than columns. In some implementations, when the method 1000 is performed with respect to rows, a shift-left operation corresponds to a shift-up operation and a shift-right operation corresponds to a shift-down operation. In some implementations, the smoothing operation illustrated in FIG. 10 is performed for one or more columns and one or more rows. In some implementations, a location on an x-axis is calculated by performing a smoothing operation on one or more columns and a location on a y-axis is calculated by performing a smooth operation on one or more rows. In some implementations, the location on the x-axis and the location on the y-axis are combined to determine a location for the touch on the touch-sensitive surface.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, as long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A touch sensing system, comprising:
   a two-dimensional capacitive sense array including a plurality of capacitive sensors, wherein each capacitive sensor is assigned a respective location type based on proximity to edges of the capacitive sense array;
   a capacitance measurement circuit coupled to the capacitive sense array and configured to measure capacitance changes at each capacitive sensor of the capacitive sense array;
   a processing unit coupled to the capacitance measurement circuit, wherein the processing unit is configured for:
      performing a scan of the capacitive sense array to measure capacitance for at least a plurality of the capacitive sensors;
      identifying a first capacitive sensor whose measured capacitance is a local peak;
      identifying a local rectangular array of capacitive sensors around the first capacitive sensor;
      for each column of the local rectangular array, summing measured capacitances for the capacitive sensors in the column to form a respective column sum; and
      determining an x-coordinate of the touch, including:
         determining whether the local peak is proximate in an x-direction to a transition point on the capacitive sense array, wherein the transition point is a point of transition between distinct location types on the capacitive sense array;
         in accordance with a determination that the local peak is not proximate in the x-direction to a transition point on the capacitive sense array, computing the x-coordinate of a touch using a plurality of the column sums; and
         in accordance with a determination that the local peak is proximate in the x-direction to a transition point on the capacitive sense array, applying a smoothing algorithm, including computing the x-coordinate of the touch as an average of two x-coordinate calculations, wherein each of the two x-coordinate calculations conditionally performs a horizontal shift of the local rectangular array based on comparing the peak measured capacitance of the first capacitive sensor to an adjacent measured capacitance and computes a respective x-coordinate using a respective plurality of the column sums.

2. The touch sensing system of claim 1, wherein applying the smoothing algorithm comprises for each of the two x-coordinate calculations:
   adding a fixed value to a column sum for a column adjacent to the column containing the first capacitive sensor to form a first modified column sum;
   subtracting the fixed value from the column sum for the column containing the first capacitive sensor to form a second modified column sum; and
   performing a horizontal shift when the first modified column sum is greater than the second modified column sum.

3. The touch sensing system of claim 1, wherein each of the two x-coordinate calculations independently applies edge correction.

4. The touch sensing system of claim 1, wherein the processing unit is further configured for:
for each row of the local rectangular array, summing measured capacitances for the capacitive sensors in the row to form a respective row sum; and
determining a y-coordinate of the touch, including:
in accordance with a determination that the local peak is not proximate in a y-direction to a transition point on the capacitive sense array, computing the y-coordinate of the touch using a plurality of the row sums; and
in accordance with a determination that the local peak is proximate in the y-direction to a transition point on the capacitive sense array, applying a second smoothing algorithm, including computing the y-coordinate of the touch as an average of two y-coordinate calculations, wherein each of the two y-coordinate calculations conditionally performs a vertical shift of the local rectangular array based on comparing the peak measured capacitance of the first capacitive sensor to a vertically adjacent measured capacitance and computes a respective y-coordinate using a respective plurality of the row sums.

5. A method of computing touch centroids for capacitive sense arrays, comprising:
at a touch sensing system, wherein the touch sensing system includes a two-dimensional capacitive sense array having a plurality of capacitive sensors, wherein each capacitive sensor is assigned a respective location type based on proximity to edges of the capacitive sense array:
performing a scan of the capacitive sense array to measure capacitance for at least a plurality of the capacitive sensors;
identifying a first capacitive sensor whose measured capacitance is a local peak;
identifying a local rectangular array of capacitive sensors around the first capacitive sensor;
for each column of the local rectangular array, summing measured capacitances for the capacitive sensors in the column to form a respective column sum; and
determining an x-coordinate of the touch, including:
determining whether the local peak is proximate in an x-direction to a transition point on the capacitive sense array, wherein the transition point is a point of transition between distinct location types on the capacitive sense array;
in accordance with a determination that the local peak is not proximate in the x-direction to a transition point on the capacitive sense array, computing the x-coordinate of a touch using a plurality of the column sums; and
in accordance with a determination that the local peak is proximate in the x-direction to a transition point on the capacitive sense array, applying a smoothing algorithm, including computing the x-coordinate of the touch as an average of two x-coordinate calculations, wherein each of the two x-coordinate calculations conditionally performs a horizontal shift of the local rectangular array based on comparing the peak measured capacitance of the first capacitive sensor to an adjacent measured capacitance and computes a respective x-coordinate using a respective plurality of the column sums.

6. The method of claim 5, wherein applying the smoothing algorithm comprises for each of the two x-coordinate calculations:
adding a fixed value to a column sum for a column adjacent to the column containing the first capacitive sensor to form a first modified column sum;
subtracting the fixed value from the column sum for the column containing the first capacitive sensor to form a second modified column sum; and
performing a horizontal shift when the first modified column sum is greater than the second modified column sum.

7. The method of claim 5, wherein each of the two x-coordinate calculations independently applies edge correction.

8. The method of claim 5, wherein the processing unit is further configured for:
for each row of the local rectangular array, summing measured capacitances for the capacitive sensors in the row to form a respective row sum; and
determining a y-coordinate of the touch, including:
in accordance with a determination that the local peak is not proximate in a y-direction to a transition point on the capacitive sense array, computing the y-coordinate of the touch using a plurality of the row sums; and
in accordance with a determination that the local peak is proximate in the y-direction to a transition point on the capacitive sense array, applying a second smoothing algorithm, including computing the y-coordinate of the touch as an average of two y-coordinate calculations, wherein each of the two y-coordinate calculations conditionally performs a vertical shift of the local rectangular array based on comparing the peak measured capacitance of the first capacitive sensor to a vertically adjacent measured capacitance and computes a respective y-coordinate using a respective plurality of the row sums.

9. A non-transitory computer-readable storage medium, storing one or more programs configured for execution by one or more processors of a touch sensing system, wherein the touch sensing system includes a two-dimensional capacitive sense array having a plurality of capacitive sensors, the one or more programs including instructions for:
performing a scan of the capacitive sense array to measure capacitance for at least a plurality of the capacitive sensors;
identifying a first capacitive sensor whose measured capacitance is a local peak;
identifying a local rectangular array of capacitive sensors around the first capacitive sensor;
for each column of the local rectangular array, summing measured capacitances for the capacitive sensors in the column to form a respective column sum; and
determining an x-coordinate of the touch, including:
determining whether the local peak is proximate in an x-direction to a transition point on the capacitive sense array;
wherein each of the capacitive sensors is assigned a respective location types based on proximity to edges of the capacitive sense array; and
wherein the transition point is a point of transition between distinct location types on the capacitive sense array
in accordance with a determination that the local peak is not proximate in the x-direction to a transition point on the capacitive sense array, computing the x-coordinate of a touch using a plurality of the column sums; and in accordance with a determination that the local peak is proximate in the x-direction to a transition point on the capacitive sense array, applying a smoothing algorithm, including computing the x-coordinate of the touch as an average of two x-coordinate calculations, wherein each of the two x-coordinate calculations conditionally performs a horizontal shift of the local rectangular array based on comparing the peak measured capacitance of the first capacitive sensor to an adjacent measured capacitance and computes a respective x-coordinate using a respective plurality of the column sums.

10. The computer-readable storage medium of claim 9, wherein applying the smoothing algorithm comprises for each of the two x-coordinate calculations:

adding a fixed value to a column sum for a column adjacent to the column containing the first capacitive sensor to form a first modified column sum;

subtracting the fixed value from the column sum for the column containing the first capacitive sensor to form a second modified column sum; and performing a horizontal shift when the first modified column sum is greater than the second modified column sum.

11. The computer-readable storage medium of claim 9, wherein each of the two x-coordinate calculations independently applies edge correction.

12. The computer-readable storage medium of claim 9, wherein the processing unit is further configured for:

for each row of the local rectangular array, summing measured capacitances for the capacitive sensors in the row to form a respective row sum; and determining a y-coordinate of the touch, including:

in accordance with a determination that the local peak is not proximate in a y-direction to a transition point on the capacitive sense array, computing the y-coordinate of the touch using a plurality of the row sums; and in accordance with a determination that the local peak is proximate in the y-direction to a transition point on the capacitive sense array, applying a second smoothing algorithm, including computing the y-coordinate of the touch as an average of two y-coordinate calculations, wherein each of the two y-coordinate calculations conditionally performs a vertical shift of the local rectangular array based on comparing the peak measured capacitance of the first capacitive sensor to a vertically adjacent measured capacitance and computes a respective y-coordinate using a respective plurality of the row sums.

* * * * *